United States Patent [19]
Schmidt et al.

[11] 3,883,468
[45] May 13, 1975

[54] THERMOPLASTIC MOLDING COMPOSITIONS

[75] Inventors: Franz Schmidt, Mannheim; Wolfgang Schenk, Schwetzingen; Rolf Wurmb, Heidelberg; Eugen Meyer-Simon, Frankfurt; Friedrich M. Thurn, Bruehl; Werner Will, Wolfgang, all of Germany

[73] Assignee: BASF Aktiengesellschaft, Ludwigshafen (Rhine), Germany

[22] Filed: Dec. 19, 1973

[21] Appl. No.: 426,029

[30] Foreign Application Priority Data
Dec. 22, 1972 Germany.................... 2262859

[52] U.S. Cl............................................ 260/37 AL
[51] Int. Cl............................................. C08g 51/10
[58] Field of Search.............................. 260/37 AL

[56] References Cited
UNITED STATES PATENTS
3,542,722  11/1970  Hafner et al. ................. 260/37 AL

*Primary Examiner*—Lewis T. Jacobs
*Attorney, Agent, or Firm*—Johnston, Keil, Thompson & Shurtleff

[57] ABSTRACT

Thermoplastic molding compositions of polyoxymethylene, glass fibers and adhesion promoting substances. The adhesion promoters used are polymeric organosilanes. The molding compositions show improved toughness and strength properties.

7 Claims, No Drawings

THERMOPLASTIC MOLDING COMPOSITIONS

This invention relates to thermoplastic molding compositions of polyoxymethylenes and glass fibers which show improved mechanical properties.

Polyoxymethylenes are materials notable for their good mechanical properties. Nevertheless, for many years there has been a desire to improve the properties of these materials, particularly their rigidity and tensile strength. To this end, glass fibers have been incorporated and these may be treated with adhesion promoters based on organosilanes of the general formula:

$$(R^1O)_3Si-R^2$$

in which $R^1$ denotes lower alkyl and $R^2$ denotes vinyl, methacryloxy-propyl, aminopropyl or glycidoxypropyl. However, these adhesion promoters, which were originally developed for use in glass-fiber-reinforced curable polymers such as unsaturated polyesters and epoxy resins, give only poor results on polyoxymethylenes. Attempts have also been made to improve the action of conventional adhesion promoters. For example, U.S. Pat. No. 3,455,867 describes a process for improving the adhesion between polyoxymethylene and glass fibers by crosslinking with isocyanates. Furthermore, U.K. Pat. No. 1,178,344 discloses a process for the manufacture of glass-fiber-reinforced polyoxymethylenes in which trioxane is copolymerized with small amounts of a cyclic ether or acetal in the presence of glass fibers which have been treated with a silane or siloxane containing epoxide groups.

The present invention relates to thermoplastic molding compositions of polyoxymethylenes and glass fibers, which show improved mechanical properties.

The thermoplastic molding compositions of the invention are characterized in that they contain, as adhesion promoting substances, polymeric organosilanes of the general formula I:

$$X_3Si-R-[(OCH_2)_n-O-R^1]_m-O-R-SiX_3 \quad (I)$$

in which

X denotes halogen, $C_{1-7}$ hydrocarbon-oxy, $C_{1-7}$ acyl-oxy or hydroxyl, the groups X being identical or different, R denotes straight-chain or branched-chain divalent $C_{2-10}$ hydocarbon radicals attached to the silicon atom by a silicon-carbon bond which may be interrupted at one or more points by an oxygen atom, the groups R being identical or different, $R^1$ denotes $C_{2-6}$ alkylene which may exhibit one or two oxygen bridges, n is a number between 1 and 5, and m is a number between approx. 10 and 200.

The six ligands X on the two silicon atoms in the compounds of formula I may be identical or different. This means that the three ligands attached to any one of the silicon atoms may differ from each other as well as from the ligands attached to the other silicon atom. For example, there may be one or two alkoxy groups together with two or one hydroxyl group on one silicon atom or there may be one or two alkoxy groups together with two or one hydroxyl group or there may be one or two halogen atoms together with two or one hydroxyl group or together with two or one alkoxy group and so on. In the extreme case, it is possible for all three of the ligands X attached to any one silicon atom to be different from each other. In all of the above variations given by way of example, there may of course be a symmetrical arrangement of ligands on the two silicon atoms taken together, or there may be a random arrangement of the six ligands attached to the two silicon atoms in the molecule. One or two of the ligands attached to each silicon atom may be replaced by other organic groups not mentioned above, for example lower alkyl or phenyl. Preferably the hydrocarbon-oxy groups or more preferably the alkoxy groups, particularly the lower alkoxy groups, i.e. methoxy and ethoxy groups, and the hydroxyl groups are identical or different. At least one and preferably all three of the ligands X on each silicon atom must be a hydroxyl group or a hydrolyzable radical.

By hydrolyzable radicals we mean generally all radicals which can be separated from the silicon atom by the action of water at room temperature.

Examples of silanes to be used in the invention as adhesion promoters are those of the following formulae:

$(H_3CO)_3Si-(CH_2)_3-[O-CH_2-O-(CH_2)_2]_8-OCH_2-O-(CH_2)_3Si(OCH_3)_3$ $(H_3CO)_3Si-(CH_2)_3-[O-CH_2-O-(CH_2)_2]_{16}-OCH_2-O-(CH_2)_3-Si(OCH_3)_3$ $(H_3CO)_3Si-(CH_2)_3-[O-CH_2-O-(CH_2)_2]_{27}-OCH_2-O-(CH_2)_3-Si(OCH_3)_3$ $(H_3CO)_3Si-(CH_2)_3-[O-CH_2-O-(CH_2)_2]_{56}-OCH_2-O-(CH_2)_3-Si(OCH_3)_3$ $(H_5C_2O)_3Si-(CH_2)_3-[O-CH_2-O-(CH_2)_2]_8-OCH_2-O-(CH_2)_3Si(OC_2H_5)_3$ $(H_5C_2O)_3Si-(CH_2)_3-[O-CH_2-O-(CH_2)_2]_{16}-OCH_2-O-(CH_2)_3Si(OC_2H_5)_3$ $(H_5C_2O)_3Si-(CH_2)_3-[O-CH_2-O-(CH_2)_2]_{27}-OCH_2-O-(CH_2)_3Si(OC_2H_5)_3$ $(H_5C_2O)_3Si-(CH_2)_3-[O-CH_2-O-(CH_2)_2]_{56}-OCH_2-O-(CH_2)_3Si(OC_2H_5)_3$ $(H_3CO)_3Si-(CH_2)_3-[O-CH_2-O-(CH_2)_4]_{20}-OCH_2-O-(CH_2)_3Si(OCH_3)_3$ $(H_5C_2O)_3Si-(CH_2)_3-[O-CH_2-O-(CH_2)_4]_{20}-OCH_2-O-(CH_2)_3Si(OC_2H_5)_3$

The $(CH_2)_2$ units contained within the square brackets may be randomly replaced by any number of $(CH_2)_4$ units.

The organosilane adhesion promoters to be used in the present invention and not forming part of the prior art may be manufactured by known methods, for example by the addition of silanes, which possess hydrogen atoms attached to silicon, to polyformals having unsaturated end groups in the presence of platinum catalysts. Such polyformals are available by polymerization of cyclic formals such as 1,3-dioxolane or butanediol formal in the presence of dialkylene formals such as diallyl formal and, if desired, in the presence of other cationically polymerizable compounds such as allyl glycidyl ether. These procedures generally produce mixtures of polyformals having various degrees of polymerization. Thus the data on the degree of polymerization are to be regarded as average values only.

The general equation illustrating the formation of the organosilanes of the invention is as follows:

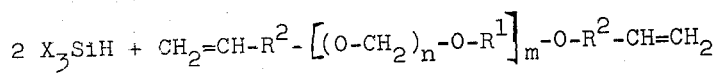

$$2\ X_3SiH + CH_2=CH-R^2-\left[(O-CH_2)_n-O-R^1\right]_m-O-R^2-CH=CH_2$$

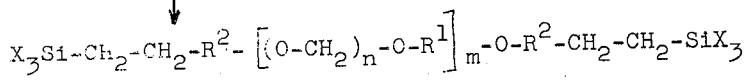

$$\downarrow \text{(Catalyst)}$$

$$X_3Si-CH_2-CH_2-R^2-\left[(O-CH_2)_n-O-R^1\right]_m-O-R^2-CH_2-CH_2-SiX_3$$

A preferred manufacture method involves the addition of trimethoxysilane to polyformals having allyl ether end groups according to the following equation:

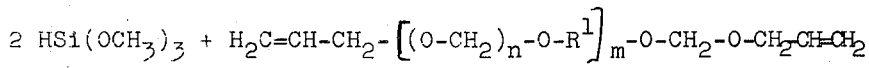

$$2\ HSi(OCH_3)_3 + H_2C=CH-CH_2-\left[(O-CH_2)_n-O-R^1\right]_m-O-CH_2-O-CH_2-CH=CH_2$$

$$\downarrow \text{(Catalyst)}$$

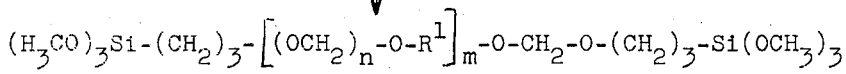

$$(H_3CO)_3Si-(CH_2)_3-\left[(OCH_2)_n-O-R^1\right]_m-O-CH_2-O-(CH_2)_3-Si(OCH_3)_3$$

In both of the above reaction equations the symbols X, $R^1$, n and m have the meanings stated above. $R^2$ is a straight-chain or branched-chain divalent hydrocarbon radical of from 1 to 8 carbon atoms which may be interrupted at one or more points by an oxygen atom, the radicals $R^2$ being identical or different. Alternatively, $R^2$ may represent a simple bond between the adjacent methylene group and the adjacent oxygen atom.

Manufacture of the compounds of the invention is possible with both homogeneous and heterogeneous catalyst systems. Examples of suitable catalysts for homogeneous systems are solutions of hexachloroplatinic acid or dichloroplatinic acetylacetonate in organic solvents such as isopropanol, acetone and methanol. Manufacture of the compounds of the invention using heterogeneous catalyst systems is suitably carried out with the use of platinum on various supports such as activated charcoal, silicon dioxide, asbestos and alumina. We prefer to manufacture the compounds of the invention with the use of platinum-on-charcoal catalysts. The use of heterogeneous catalyst systems has a practical advantage over the use of homogeneous systems in that the reaction product may be readily separated from heterogeneous catalysts, for example by filtration.

The adhesion-promoting substances used in the invention may be added to the mixture of polyoxymethylene and glass fibers during blending. It is particularly advantageous, however, to treat the glass fibers with the present adhesion promoters and then to blend the treated glass fibers with the polyoxymethylene. To this end, use may be made, for example, of a water-treated glass fiber roving (e.g. Roving 861 by Owens Corning Fiberglas). In addition to the adhesion promoters, the glass fibers may have applied thereto other substances, particularly film-forming polymeric substances, which are intended to protect the sensitive glass fiber surface from mechanical damage.

The organosilanes used in the invention are generally preferably employed in amounts of from 0.2 to 2.0 percent by weight of the weight of glass fibers.

When the glass fibers are treated with the adhesion promoters of the invention, a convenient rate of application is from 0.2 to 0.6 percent by weight of the weight of glass fibers. When said adhesion promoters are added to the mix together with the polymer granules, the feed rate is conveniently from 0.5 to 2.0 percent by weight.

The ratio of polyoxymethylene to glass fibers in the molding compositions of the invention may be varied within wide limits. In general, the molding compositions contain glass fibers in an amount of from 15 to 50 percent by weight of the total weight of the mix. It is particularly advantageous to use an amount of from 25 to 35 percent by weight.

Polyoxymethylene derivatives to which the novel adhesion promoters may be applied are homopolymers of formaldehyde and homo- and copolymers of trioxane. The homopolymers should possess thermally stable end groups such as ester or ether end groups. The copolymers of trioxane should contain more than about 50 percent and preferably more than about 75 percent of oxymethylene groups and at least approx. 0.1 percent of comonomer groups introducing at least two adjacent carbon atoms into the oxymethylene chain. Copolymers of this kind may be produced in known manner by cationic copolymerization of trioxane with suitable comonomers such as cyclic ethers or acetals, e.g. ethylene oxide, 1,3-dioxolane, 1,3-dioxane, 1,3-dioxacycloheptane and 1,3,6-trioxacyclooctane, or with linear oligo- or polyformals or oligoor polyacetals, such as polydioxolane and polybutanediolformal. Other cationically copolymerizable compounds may be used alone or in the form of mixtures, as may also be chain stoppers and polyfunctional branching comonomers. The polymers may contain stabilizers, i.e. heat stabilizers, antioxidants and, if necessary, light stabilizers.

Manufacture of the thermoplastic molding compositions of the invention may take place in suitable kneading equipment. It is particularly advantageous to use twin-worm extruders. There are two possibilities: either the polymer granules which have been mixed with the adhesion promoters are processed together with suitable commercially available glass fibers, e.g. grade K 127 by Gevetex Textilglas BmbH or grade 409 by Owens Corning Fiberglas or the water-treated roving grade 861 by Owens Corning Fiberglas, or the glass fibers, advantageously continuous glass filaments, which have been treated with the organosilanes of the invention, are added to the polyoxymethylenes.

The following Examples serve to illustrate the invention.

EXAMPLE 1

Manufacture of adhesion promoters of the invention

A 1 l triple-neck flask equipped with stirrer, reflux condenser, dropping funnel and immersion thermometer is charged with 500 g of a polyformal having allyl ether end groups together with a commercial 0.1 percent w/w platinum-on-charcoal catalyst in an amount of 5 g per mole of C=C double bonds in the polyformal, and the mixture is heated at 80°C under a blanket of nitrogen and with the exclusion of moisture. 1.5 moles of trialkoxysilane per mole of C=C bonds (50 percent excess) are added dropwise over 20 minutes. An exothermic reaction takes place which is completed by heating for 2 hours at 120°C.

After cooling, the excess trialkoxysilane is removed by vacuum distillation and the reaction product is separated from the catalyst by hot filtration. When the viscosity of the starting materials and end products is high, benzene is used as diluent.

The resulting reaction products are highly viscous or crystalline colorless substances soluble in organic solvents and water.

The course of the reaction as indicated by the above general reaction equations was demonstrated by nuclear resonance spectroscopy.

EXAMPLE 2

A copolymer of trioxane and 2 percent of ethylene oxide (melt index 9 at a temperature of 190°C and a load of 2.16 kg) was melted in a ZSK twin-worm extruder by Werner und Pfleiderer. Said extruder possessed a port downstream of the melting zone, and the continuous glass filaments were introduced through said port. Said glass filaments had been treated with adhesion promoters as given in Table 1 below. The adhesion promoters have the formula:

$(CH_3O)_3Si-(CH_2)_3-[OCH_2-O-CH_2CH_2]_m-OCH_2-O(CH_2)_3-Si(OCH_3)_3$ where $m$ represents various values of the average degree of polymerization, indicated in Table 1 by the molecular weight.

The melt containing the chopped strands was extruded through a die and the extrudate was granulated with suitable equipment. The granules were injection molded to form test specimens on which the mechanical values given in Table 1 were measured.

TABLE 1

Mechanical Properties of Polyoxymethylene Reinforced with Pretreated Glass Fibers

| Polyoxy-methylene [%] | Glass Fibers [%] | Adhesion Promoter | Amount [%] | Tensile Strength DIN 53455 kg/cm² | Impact Resistance DIN 53453 cmkg/cm² |
|---|---|---|---|---|---|
| 70 | 30 | none | — | 650 | 8.5 |
| 70 | 30 | ad.prom. A mol.wt.about 1,000 | 0.2 | 1050 | 12.2 |
| 70 | 30 | ad.prom. B mol.wt.about 2,000 | 0.4 | 1125 | 13.2 |
| 63 | 35 | ad.prom. C mol.wt.about 1,500 | 0.3 | 1086 | 11.8 |

EXAMPLE 3

Following the procedure described in Example 2, polyformaldehyde having a melt index of from 8 to 10 at 190°C and a load of 2.16 kg is reinforced with glass fibers. In this case, however, the glass fibers were not treated with adhesion promoters but were directly fed to the extruder with the polymer granules. The results obtained are listed in Table 2 below.

TABLE 2

Mechanical Properties of Polyoxymethylene Reinforced with Glass Fibers with Addition of Adhesion Promoters to the Polymer

| Polyoxy-methylene | Glass Fibers | Adhesion Promoter | Tensile Strength DIN [kg/cm²] | Impact Resistance DIN [cmkg/cm²] |
|---|---|---|---|---|
| 70% | 30% | 0.5% of A | 1045 | 10.2 |
| 70% | 30% | 0.5% of B | 1130 | 12.4 |
| 70% | 30% | 0.5% of C | 1086 | 12.8 |
| 70% | 30% | — | 810 | 8.9 |

We claim:
1. A thermoplastic molding composition comprising:
a. a polyoxymethylene;
b. from about 15–50 percent by weight of glass fibers; and,
c. from 0.2 to 2.0 percent by weight of a polymeric organosilane adhesion promoter of the formula I

$$X_3Si-R-(OCH_2)_n-O-R^1{}_m-O-R-SiX_3 \quad (I)$$

in which
X denotes halogen, $C_{1-7}$ hydrocarbon-oxy, $C_{1-7}$ acyloxy or hydroxyl, the groups X being identical or different,
R denotes straight-chain or branched-chain divalent $C_{2-10}$ hydrocarbon radicals attached to the silicon atom by a silicon-carbon bond which may be interrupted at one or more points by an oxygen atom, the groups R being identical or different,
$R^1$ denotes $C_{2-6}$ alkylene which may exhibit one or two oxygen bridges,
n is a number between 1 and 5, and
m is a number between approx. 10 and 200.

2. A thermoplastic molding composition as claimed in claim 1, wherein the adhesion promoting substances used are polymeric organosilanes of the formula:

$$(H_3CO)_3Si-(CH_2)_3-[O-CH_2-O-(CH_2)_2-]_m-OCH_2-O-(CH_2)_3-Si(OCH_3)_3.$$

3. A thermoplastic molding composition as claimed in claim 1, wherein the adhesion promoting substances are polymeric organosilanes of the formula:

$$(H_5C_2O)_3Si-(CH_2)_3-[O-CH_2-O-(CH_2)_2-]_m-OCH_2-O-(CH_2-O-(CH_2)_3-Si(OC_2H_5)_3$$

4. A thermoplastic molding composition as set forth in claim 1 wherein the amount of glass fiber is from 0.2 to 0.6 percent by weight.

5. A thermoplastic molding composition as set forth in claim 1 wherein the amount of glass fiber is from 0.5 to 2.0 percent by weight.

6. A thermoplastic molding composition as set forth in claim 1 wherein the amount of glass fiber is from 25 to 35 percent by weight.

7. A thermoplastic molding composition as set forth in claim 1 wherein the polyoxymethylene contains more than 75 percent by weight of oxymethylene groups.

* * * * *